(12) United States Patent
Cunningham et al.

(10) Patent No.: US 11,936,522 B2
(45) Date of Patent: Mar. 19, 2024

(54) SELECTING AND OPERATING AN OPTIMAL VIRTUAL PRIVATE NETWORK AMONG MULTIPLE VIRTUAL PRIVATE NETWORKS

(71) Applicant: Connectify, Inc., Philadelphia, PA (US)

(72) Inventors: Kevin Cunningham, Swarthmore, PA (US); Brian Prodoehl, Plymouth Meeting, PA (US); Alexander Gizis, Philadelphia, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

(21) Appl. No.: 17/499,829

(22) Filed: Oct. 12, 2021

(65) Prior Publication Data

US 2022/0116273 A1     Apr. 14, 2022

Related U.S. Application Data

(60) Provisional application No. 63/091,352, filed on Oct. 14, 2020.

(51) Int. Cl.
| | | |
|---|---|---|
| *H04L 41/0816* | (2022.01) | |
| *H04L 41/5009* | (2022.01) | |
| *H04L 43/0811* | (2022.01) | |

(52) U.S. Cl.
CPC ...... *H04L 41/0816* (2013.01); *H04L 41/5009* (2013.01); *H04L 43/0811* (2013.01)

(58) Field of Classification Search
CPC .............. H04L 12/4633; H04L 12/4641; H04L 63/0272; H04L 41/12; H04L 43/08; H04L 63/20; H04L 41/0823; H04L 41/22; H04L 43/16; H04L 45/24; H04L 45/54; H04L 45/64; H04L 65/102; H04L 65/80; H04L 41/0806; H04L 41/0893; H04L 41/0896; H04L 45/02; H04L 47/125; H04L 47/20; H04L 47/726; H04L 49/25; H04L 63/0263; H04L 63/029; H04L 29/06551;

(Continued)

(56) References Cited

U.S. PATENT DOCUMENTS 6,708,187 B1 *  3/2004  Shanumgam ....... H04L 41/0233
                                                       709/224
8,443,435 B1 *  5/2013  Schroeder ............... H04L 63/08
                                                         726/15

(Continued)

*Primary Examiner* — Greg C Bengzon
(74) *Attorney, Agent, or Firm* — Kamran Emdadi

(57) ABSTRACT

One example process may include enabling a connection between one of a plurality of client devices and one or more servers via one of a plurality of virtual private network servers (VPNs), monitoring connection performance of the connection over a period of time, modifying one or more connection parameters associated with the connection of the one client device based on the monitored connection performance, identifying whether an increase or decrease in a performance of the connection has occurred based on the modified one or more connection parameters, when an increase in performance is identified, storing a current connection status and the modified one or more modified connection parameters in a temporary data file, and transmitting the temporary data file to one or more of the other VPN servers and the plurality of client devices.

17 Claims, 11 Drawing Sheets

(58) Field of Classification Search
CPC ............... H04L 41/069; H04L 41/0816; H04L 41/5025; H04L 43/04; H04L 43/0811; H04L 43/12; H04L 43/50; H04L 47/10; H04L 63/02; H04L 63/10; H04L 63/105; H04L 63/107; H04L 63/14; H04L 63/1408; H04L 67/148; H04L 41/0654; H04L 41/0803; H04L 41/5009; H04L 41/5051; H04L 41/5077; H04L 43/045; H04L 43/065; H04L 43/0817; H04L 43/0829; H04L 43/0852; H04L 43/0882; H04L 43/0894; H04L 43/10; H04L 45/50; H04L 45/70; H04L 47/781; H04L 67/02; H04L 67/10; H04L 67/42; H04L 69/22
See application file for complete search history.

(56) References Cited

U.S. PATENT DOCUMENTS

| | | | | |
|---|---|---|---|---|
| 10,148,732 | B2* | 12/2018 | Gizis | H04L 67/06 |
| 10,257,167 | B1* | 4/2019 | Matthews | H04L 12/4633 |
| 10,484,335 | B2* | 11/2019 | Prodoehl | H04L 63/08 |
| 10,601,779 | B1* | 3/2020 | Matthews | H04L 12/4641 |
| 11,134,060 | B2* | 9/2021 | Hussain | H04L 69/22 |
| 2005/0088977 | A1* | 4/2005 | Roch | H04L 63/0272 370/254 |
| 2008/0172732 | A1* | 7/2008 | Li | H04L 12/4641 726/15 |
| 2012/0005477 | A1* | 1/2012 | Wei | H04L 63/166 713/153 |
| 2013/0205025 | A1* | 8/2013 | Shamsee | H04L 45/12 709/225 |
| 2013/0318345 | A1* | 11/2013 | Hengeveld | H04L 12/4633 713/168 |
| 2014/0109178 | A1* | 4/2014 | Barton | G06F 21/604 726/1 |
| 2014/0136597 | A1* | 5/2014 | Bland | H04L 12/4641 709/203 |
| 2015/0085664 | A1* | 3/2015 | Sachdev | H04L 41/5019 370/236 |
| 2015/0263865 | A1* | 9/2015 | Rangarajan | H04L 12/4633 370/254 |
| 2017/0019811 | A1* | 1/2017 | Parulkar | H04W 28/0247 |
| 2017/0026468 | A1* | 1/2017 | Kumar | H04L 67/1095 |
| 2017/0054758 | A1* | 2/2017 | Maino | H04L 45/64 |
| 2017/0099159 | A1* | 4/2017 | Abraham | H04L 45/54 |
| 2017/0317894 | A1* | 11/2017 | Dao | H04L 41/5009 |
| 2017/0359311 | A1* | 12/2017 | Chen | H04L 12/4679 |
| 2017/0364702 | A1* | 12/2017 | Goldfarb | G06F 21/6218 |
| 2017/0366395 | A1* | 12/2017 | Goldfarb | H04L 63/0272 |
| 2017/0366416 | A1* | 12/2017 | Beecham | H04L 41/22 |
| 2018/0367340 | A1* | 12/2018 | Shaw | H04L 12/4633 |
| 2019/0052482 | A1* | 2/2019 | Yang | H04L 63/0428 |
| 2019/0058694 | A1* | 2/2019 | Hussain | H04L 12/4641 |
| 2019/0215308 | A1* | 7/2019 | Feyzibehnagh | H04L 63/0428 |
| 2019/0327312 | A1* | 10/2019 | Gupta | H04L 67/148 |
| 2020/0067877 | A1* | 2/2020 | Hoy | H04L 63/029 |
| 2020/0106687 | A1* | 4/2020 | Nambisan | H04L 12/2854 |
| 2021/0021445 | A1* | 1/2021 | Chen | H04L 41/0886 |
| 2021/0378041 | A1* | 12/2021 | Narasimha | H04W 24/04 |
| 2023/0091527 | A1* | 3/2023 | Sapp | H04L 9/3218 |

* cited by examiner

400

| APP NAME 410 | HOST NAME 420 | DATA TYPE 430 | PORT # 440 | PARAMETER SETTING(S) 450 |

| OUTGOING SETTING 510 |
| INCOMING SETTING 520 |
| OUTGOING ENABLED 530 |
| INCOMING ENABLED 540 |

| PARAMETER 1 610 | PARAMETER 2 620 | PARAMETER 3 630 | DATA SOURCE 640 |

| PARAMETER 1 710 | SETTING 1 720 | SETTING 2 730 | SETTING 3 740 |

| PARAMETER 1 | COMPRESS HEADER 810 |
| PARAMETER 2 | COMPRESS BODY 820 |
| PARAMETER 3 | TCP 830 |
| PARAMETER 4 | UDP 840 |
| . . | |
| PARAMETER N | N 850 |

| USER ID 910 | IP AD. 920 | INPUT REC. 930 | OUTPUT REC. 940 | INPUT RECEPTIVE PARAMETER 950 |
|---|---|---|---|---|

FIG. 9

SELECTING AND OPERATING AN OPTIMAL VIRTUAL PRIVATE NETWORK AMONG MULTIPLE VIRTUAL PRIVATE NETWORKS

CROSS-REFERENCE TO RELATED APPLICATIONS

The present invention claims priority to U.S. provisional patent application No. 63/091,352 filed on Oct. 14, 2020 and entitled, "METHOD AND APPARATUS FOR OPERATING MULTIPLE VIRTUAL PRIVATE NETWORKS AND SELECTING DATA SOURCES FOR VPN BYPASS," the entire contents of which are hereby incorporated by reference in its entirety.

BACKGROUND OF THE INVENTION

A virtual private network (VPN) permits a computer (client device) and a remote server to communicate securely. The VPN also enables the IP address of the client to be effectively hidden from the remote server. The VPN further provides security, encryption and other ways to maintain a secure connection.

In a conventional VPN, predefined or rolling algorithms permit the secure connection between the client and the remote server. This connection is made over any network, including the Internet, with security managed by the VPN layer on the VPN server. Any software applications on the client computer will see the VPN layer as a VPN client, appearing no different than the driver for a physical network interface. The VPN client encapsulates all traffic sent to it (in some cases as encrypted, private data), and then sends the data via a standard network interface and driver to a physical network interface device, such as a Wi-Fi or Ethernet device. From there, the data may travel to the Internet via a LAN and ISP.

A single ISP can in many cases handle both cellular access and a LAN, although this is merely exemplary. For example, respectively different ISPs may be used for cellular access and the LAN.

The VPN data may be secure over the Internet, using encryption, and is subsequently sent to the VPN server. The VPN server may decapsulate (e.g., decrypt) the data received from the VPN client via a decapsulate/encapsulate module before sending the decrypted data to the remote server. The remote server may transmit a response to the VPN server, which may be encrypted and sent to the computer or client device, which decrypts the data.

In operation, the client communicates over the Internet with multiple servers. A server may provide the client with streaming content while another server may provide the client with non-streaming content, such as the download of a static webpage. The client transmits requests for data from the server via an optional LAN, the ISP, and the Internet. The server (and other servers) responds to data requests via the Internet.

SUMMARY OF THE INVENTION

A method of providing multiple VPNs between clients and servers includes enabling communication between one of said clients and one of said servers via one of the VPNs, changing one parameter relating to the communication so that the communication occurs or is attempted with the one parameter at different settings, identifying which of the settings results in the communication, or increases a rate of the communication, or decreases an error rate of the communication, and communicating the setting to others of the clients that communicate via respective ones of the VPNs, and, enabling the others of the clients to communicate via respective ones of the VPNs with the setting.

Another example embodiment may include enabling a connection between one of a plurality of client devices and one or more servers via one of a plurality of virtual private network servers (VPNs), monitoring connection performance of the connection over a period of time, modifying one or more connection parameters associated with the connection of the one client device based on the monitored connection performance, identifying whether an increase or decrease in a performance of the connection has occurred based on the modified one or more connection parameters, when an increase in performance is identified, storing a current connection status and the modified one or more modified connection parameters in a temporary data file, and transmitting the temporary data file to one or more of the other VPN servers and the plurality of client devices.

Another example embodiment may include an apparatus that includes a processor configured to enable a connection between one of a plurality of client devices and one or more servers via one of a plurality of virtual private network servers (VPNs), monitor connection performance of the connection over a period of time, modify one or more connection parameters associated with the connection of the one client device based on the monitored connection performance, identify whether an increase or decrease in a performance of the connection has occurred based on the modified one or more connection parameters, when an increase in performance is identified, store a current connection status and the modified one or more modified connection parameters in a temporary data file, and a transmitter configured to transmit the temporary data file to one or more of the other VPN servers and the plurality of client devices.

Another example embodiment may include a non-transitory computer readable storage medium configured to store instructions that when executed cause a processor to perform enabling a connection between one of a plurality of client devices and one or more servers via one of a plurality of virtual private network servers (VPNs), monitoring connection performance of the connection over a period of time, modifying one or more connection parameters associated with the connection of the one client device based on the monitored connection performance, identifying whether an increase or decrease in a performance of the connection has occurred based on the modified one or more connection parameters, when an increase in performance is identified, storing a current connection status and the modified one or more modified connection parameters in a temporary data file, and transmitting the temporary data file to one or more of the other VPN servers and the plurality of client devices.

BRIEF DESCRIPTION OF THE DRAWINGS

FIG. 4 is a diagram that illustrates an exemplary data structure that may be used for storing one or more parameters relating to data communication.

FIG. 5 is a diagram that illustrates an exemplary data structure relating to sharing of settings between VPNs.

FIG. 6 is a diagram that illustrates an exemplary data structure relating to exemplary parameters that may be used for transferring data from/to a source/destination of data.

FIG. 7 is a diagram that illustrates an exemplary data structure relating to one or more settings that may be used for transferring data from/to a source/destination of data.

FIG. 8 is a diagram that illustrates an exemplary data structure relating to multiple exemplary parameters that may affect transferring data from/to a source/destination of data.

FIG. 9 is a diagram that illustrates an exemplary data structure relating to receiving and/or transmitting one or more parameters relating to data transfer.

DETAILED DESCRIPTION

Figure 1:
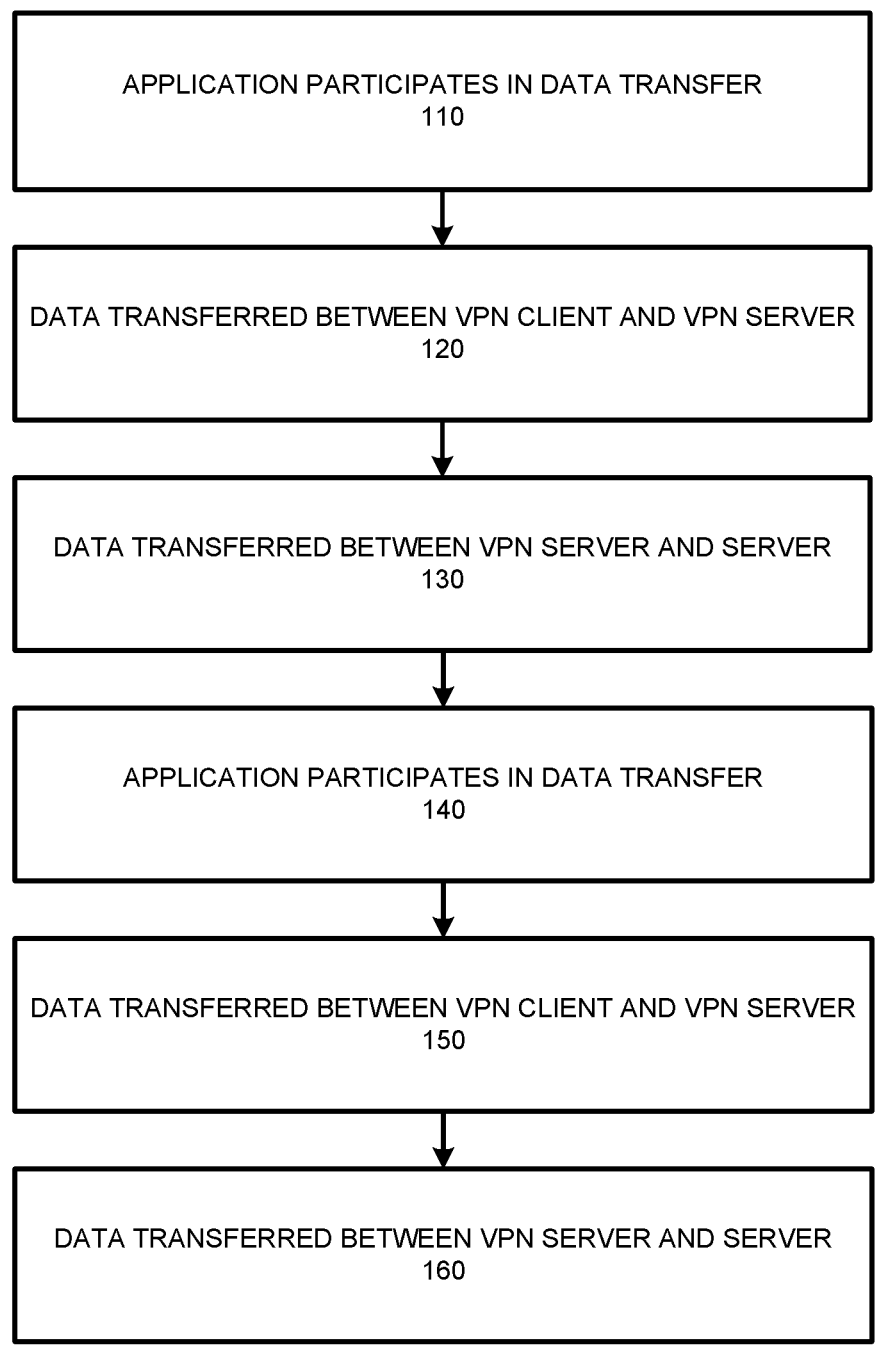
FIG. 1 is a flow chart diagram that illustrates steps related to data transfer between a VPN server and a VPN client.

FIG. 1 is a flow chart diagram 100 that illustrates exemplary operation between multiple clients that communicate with one or more servers to obtain content. In particular, two or more clients are operating a common type of application and may be communicating with a common type of remote server. Each client device 'client' may communicate with the common server(s) via a common VPN server or respectively different VPN servers depending on the settings, preferences and/or communication metrics and protocols. For example, one VPN (VPN-1) may be identified by the group of clients as being for data streaming purposes only. Another VPN (VPN-2) may be identified as being the most reliable in terms of data rate, latency, jitter, least amount of packet loss per unit time, etc., however, VPN-2 may not be available for streaming purposes.

Another VPN (VPN-3) may be used for more than one purpose including data reliability metrics as indicated above with respect to the VPN-2, however, VPN-3 may also be available for streaming purposes, such as a backup streaming VPN server. The options for which of 'N' VPN servers to utilize may be customized and shared with all client devices via a set of instructions shared as part of a temporary data file distributed to all client devices. The VPN assignments may be identified based on data network performance and may be dynamically updated to include new or to remove other VPNs over time depending on the detected performance. The performance characteristics and/or purpose of each VPN may be updated dynamically and stored in the temporary data file which is accessible to each client device during a VPN selection process. The creation, updating and distributing of the temporary data file may be performed by one or more of the client devices or by an intermediary device, such as an access point to the ISP or another device on the network. The VPNs themselves may be responsible for the VPN assignments and designations made to the client devices. Additionally, certain parameters used by the client devices may be modified depending on which VPN is being used. For example, for VPN-1, a first data rate may be applied as a maximum data rate to use which cannot be exceeded. For VPN-2, a certain type of data may be exchanged, such as encrypted streaming data packets and/or a particular data protocol type, such as UDP vs. TCP.

In FIG. 1, 110 relates to an application that is executing on a computer device (client) such as a PC, smartphone, etc. The client may be identified as 'C1'. The application is participating in a data transfer. The data transfer may be initiated by the application, or the data transfer may be initiated by a remote server. The application may be transmitting data, receiving data, or both.

The application is communicating with a remote server via a VPN, such a VPN-1. Thus, the application may be executing in a client device, and the client may include a VPN client as a plug-in or agent application operating on the client device to communicate with the VPN. The VPN client may be communicating with a VPN server via the Internet. At 120, data is transferred between the VPN client and the VPN server.

At 130, data is transferred between the VPN server and the remote server. Thus, the progression may be, for example: VPN client, ISP, Internet, VPN server, Internet, remote server (or in the reverse order) depending on the direction data is being transferred.

At 140, the same application (or type of application) described with regard to 110 is participating in a data transfer. The application in 140 is executing from a different client than the client described with regard to 110. The application in 140 may be transferring data with the same remote server (or type of remote server) that is described with regard to 110. For example, the application in 110 and 140 may both be streaming programming on a video streaming service.

At 150, data received and/or transmitted by the client described with regard to 140 transfers data via a VPN. The VPN transfers data between a VPN client included in the client of 140 and a VPN server. The VPN server of 150 may be the same VPN server or a VPN server different from the one described with regard to 120. Regardless, at 150, data is transferred by a VPN.

At 160, the application referenced in 140 exchanges data with a remote server via a VPN server.

Figure 2:
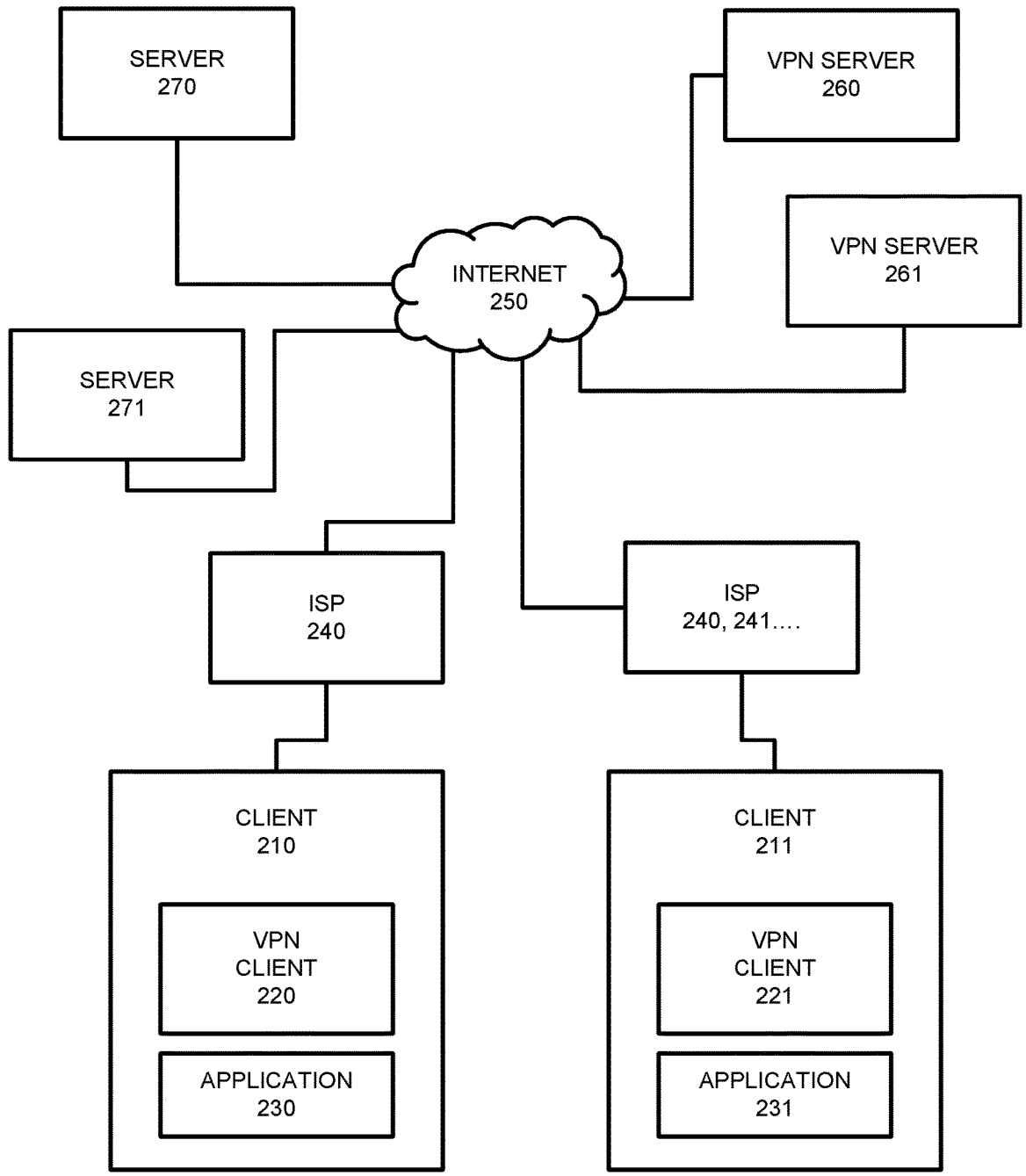
FIG. 2 is a block diagram that illustrates multiple VPN clients communicating with one (or more) VPN servers and one (or more) remote servers.

FIG. 2 is a block diagram 200 that illustrates exemplary communication with one or more servers via respective VPNs. In FIG. 2, application 230 and application 231 may be the same application, but this is exemplary as the applications may be different and may include different types of data, packets, protocols, etc. Client 210 includes VPN client 220. VPN client 220 and VPN server 260 may be communicating via application 230, which transfers data to the VPN 260 in order to communicate with server 270 via a VPN formed by VPN client 220 and VPN server 260. Application 231 is also exchanging data with, for example, server 270. In one exemplary embodiment, server 271 is optionally included and application 231 exchanges data with server 271. In one exemplary embodiment, server 270 and optional server 271 are controlled by a common entity (for example, an entity such as a streaming video service, may operate multiple servers with different content, different geographical locations, different geographically based users, etc.).

Data is exchanged between server 270 and application 230 via Internet 250. Application 230 communicates with ISP 240 via VPN client 220. Application 230 and VPN client 220 are situated within client 210. ISP 240 enables VPN client 220 to communicate with Internet 250. Data is exchanged between Internet 250 and server 270.

Application 231 is situated within client 211. Client 211 includes VPN client 221. VPN client 221 and VPN server 260 (or optional VPN server 261) together form a VPN. Data is exchanged between application 231 and Internet 250 via ISP 240, 241 (either the same ISP 240 as is used by client 210 or a different ISP 241). ISP 240, 241 enables communication with Internet 250. Application 231 communicates with server 270 (or optionally server 271) via VPN server 260 (or optionally VPN server 261).

As application 230 and application 231 may be the same application (handling similar data or similar types of data), at least one parameter used by application 230 and application 231 may have a common setting. One setting for a parameter used by application 230 may provide for improved communication compared to another setting for a parameter used by application 230. As that setting may result in improved communication for application 230, that same setting may also result in improved communication for application 231.

Examples of the "same" application may be that both applications provide for services to be provided from a common video streaming service. For example, application 230 and application 231 may each be a video streaming application that permits respective users to access streaming video content from a common video content library. Application 230 and application 231 may alternatively be the same "type" of application but may be different from one another. For example, application 230 and application 231 may each be web browsers, but respectively different web browsers belonging to two different organizations with different proprietary settings. A common setting for one parameter used by application 230 and application 231 may result in optimal operation of application 230 and application 231. In order to identify the common setting (e.g., data rate, protocol, packet types, etc.), the first application being monitored may be performing a service, such as video streaming for a first period of time. The progress may not exceed any data rate or related thresholds, such a packet loss rate or minimum data rate, etc. Once the success of the first application 230 is identified on a particular VPN server for a particular period of time, the application settings and related information may be stored in a temporary data file and shared with the other clients and enacted by their respective VPN clients.

Examples of "optimal" operation and corresponding application settings include (but are not limited to): faster speed (download and/or upload, bandwidth and/or throughput), lower latency, lower jitter, lower error rate, lower packet loss, higher mean opinion score (MOS), faster response time, lower battery consumption, fewer "dropped" connections, etc.

Other exemplary parameters to be established when identifying an optimal connection and a baseline approach to share with other clients include the selection of a VPN server, selection of a communications protocol(s), selection of a header compression type, selection of body compression type, etc. One way to determine whether a connection is optimal is to monitor the connection and determine whether any operation parameter thresholds are exceeded in a defined period of time. For example, if a jitter rate or packet loss rate is exceeded (i.e., threshold) within a period of 10 seconds, then the connection may not be optimal.

Settings for "selection of a VPN server" include selection of a VPN server with a first IP address, selection of a VPN server with a second IP address, etc.

Settings for "selection of communications protocol" include: TCP, UDP, etc.

Settings for "selection of header compression" include header compression on, header compression off, etc.

Settings for "selection of body compression" include body compression on, body compression off, etc.

Settings for "data rate" may include Mbps, and "data type" may include, audio, video, or other types of packets.

The above parameters are merely examples. Settings for multiple parameters may be respectively selected for determining an optimal VPN setting(s). Settings for other parameters besides those set forth above may be selected. Settings other than the settings set forth above may also be selected. Multiple settings for a single parameter may be selected (e.g. one setting may apply to some data while another setting may apply to other data, different settings may apply at different times, or under different conditions, etc.).

When a setting for a parameter provides an increased operation of an application communicating via one VPN, that same setting for the same parameter may optimize operation of an application communicating via another VPN. Thus, in one exemplary embodiment, that setting for a parameter used for an application to communicate may be communicated so that it affects operation of another application. The setting from the parameter may be communicated from one application to another application, from one client to another client, from one VPN client to another VPN client, from one VPN server to another VPN server, for one VPN server to use when communicating with multiple VPN clients, from a component of one VPN to a component of another VPN, etc.

Thus, client 210 may exchange data with server 270. The exchange of data may include execution of application 230. Data is exchanged between client 210 and server 270 via Internet 250 and VPN server 260. Client 211 may also exchange data with server 270 (or server 271). The exchange of data may include execution of application 231. Application 230 and application 231 may be the same (or the same type of application while being from different organizations). For example, application 230 and application 231 may be applications created by the same video streaming organization. The two applications may be the same application or similar. Alternatively, the two applications may be of a similar type, for example application 230 may be a video streaming application and application231 may by a different video streaming application. Various settings may be used for a parameter that affects communication between application 230 and server 270. When one parameter is found to produce optimal communication compared to another parameter, the one parameter is communicated to client 211, and client 211 may use the same parameter to communicate between client 211 and server 270 (or server 271).

In one example, client 210 may be streaming data at a fixed data rate from server 270. The data rate may be the most optimal one used based on historical data. The period of time used to monitor that data rate may be fulfilled and the result may be written to a temporary data file to include the VPN used, the data rate used, the type of data exchanged, the name of the server, the name of the VPN (e.g., name/IP address) etc., which is shared with client 211. The result may include client 211 attempting to communicate with the same server 270 for the same purpose (streaming video data) by implementing the shared communication data stored and shared to identify the communication strategy of client 210.

Figure 3:
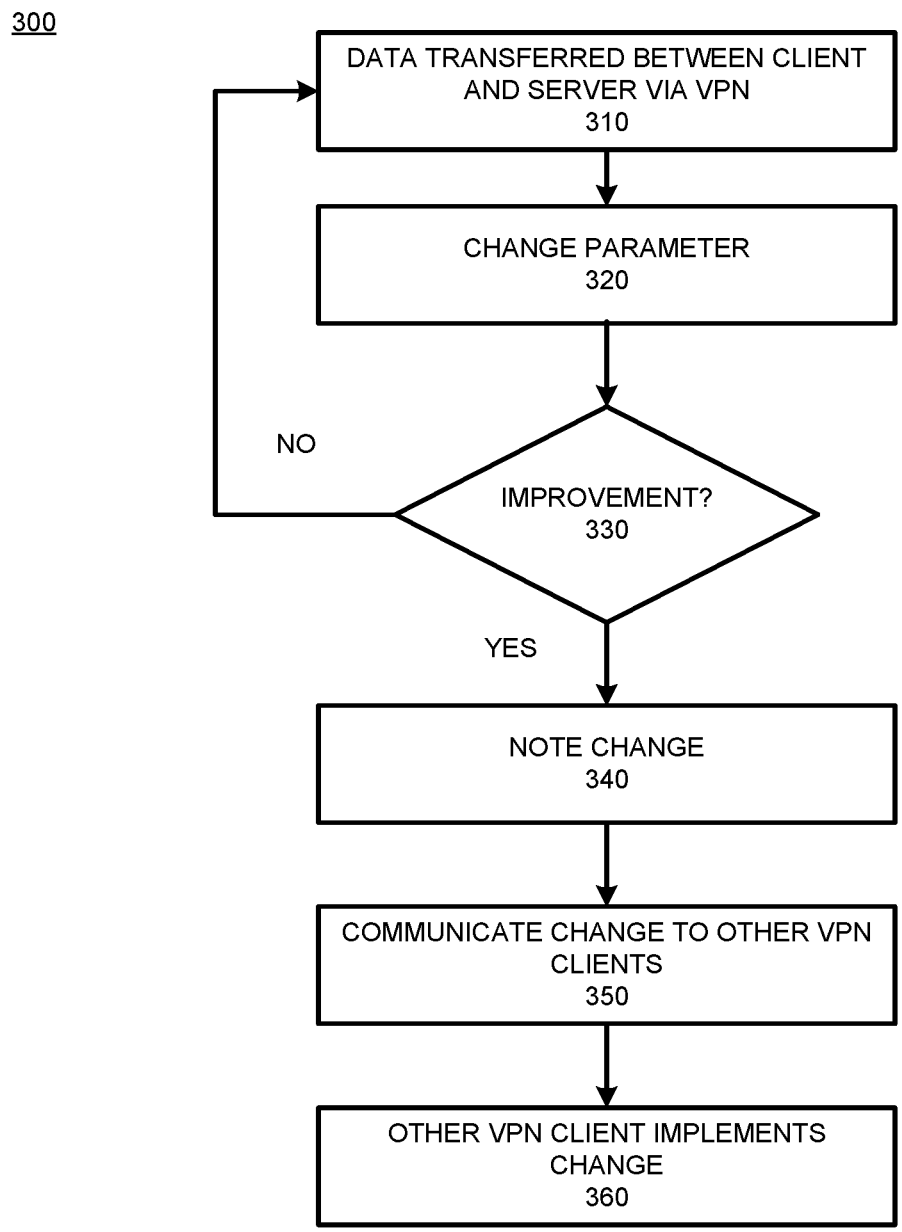
FIG. 3 is a flow chart diagram that illustrates changing at least one parameter relating to data transfer.

FIG. 3 is a flow chart diagram 300 that illustrates operation of an exemplary embodiment of the present invention. In the example of FIG. 3, two applications that are the same (or similar, or same/similar type) are being executed on respectively different clients. At 310, data is transferred between a client and a server via a VPN. For example, data is transferred between client 210 and server 270.

Various parameters govern the exchange of data between client 210 and server 270. At 320, the setting of one (or more) of these data network parameters is changed. Optionally, the setting of one (or more) of these parameters is changed multiple times. At 330, the change in settings is evaluated to determine if the change in settings has resulted in an optimization in communication (e.g., as illustrated above, faster speed, lower error rate, etc.). Processing may optionally loop between 320 and 330 until an increase in performance is detected. Monitoring may be performed to detect measuring a faster speed, lower error rate, etc. At 340, the setting of the parameter that resulted in an increase in performance is identified and stored. Prior to 350, client 211 is communicating with server 270 (or server 271) using application 231, which is the same/similar/similar type as application 230. At 350, the parameter setting(s) that resulted in improved communication for client 210 operating application 230 is communicated to VPN client 221. At 360, VPN client 221 implements the parameter setting that was communicated to it during 350. The implementation may include retrieving an updated temporary data file provided by another client device or the VPN attempting to be used when an application is launched by the client device attempting to apply a newly identified communication setting/parameter.

The approach for communicating the parameter(s)/setting(s) from client 210 to another client device 211 or from one VPN client to a second VPN client may take several forms. For example, the updated information file may be communicated from (a first) VPN client 220 to VPN server 260, and VPN server 260 may communicate that parameter setting to multiple VPN clients with which it communicates. If the parameter/setting is communicated to a second VPN client and there is a "match," then 350 is performed and the parameter setting is implemented for that VPN client. A "match" may mean that both VPN clients are running a common application, or, if each application is assigned an application "type" code, then both applications have associated with themselves a common type code. In these various examples, the VPN server 260 (or some other server) communicates with each VPN client after one VPN client communicates to VPN server 260 that it is using a parameter setting with an application (or application type) in the manner illustrated by FIG. 3. After VPN server 260 (or another server) communicates that information to each VPN client, if there is an application match, then 360 is performed and the parameter setting is used by other VPN clients executing the same application (or application type). In this example, the VPN may store the temporary data file and forward the data file to the VPN client of the client device when the client attempts to communicate with the VPN.

FIG. 4 illustrates a data structure 400 that may be included in VPN clients 220 and 221. The data structure enables VPN clients 220, 221 to use a specific parameter setting when a specific application (or application type) is communicating with a particular server, such as server 270. When clients 210, 211 are communicating with server 270 via respective VPN clients 220, 221, one or more parameter settings control the respective communication. In accordance with an exemplary embodiment of the present invention, when specific applications are being executed within each client 210, 211, specific parameter settings may govern communication with those respective applications. For example, when one application is being used, the TCP protocol may be used. When another application is being used, the UDP protocol may be used. FIG. 4 illustrates a data structure included in each VPN client so that when a respective application is in use, a respective parameter setting is in use.

FIG. 4 illustrates that data structure 400 includes storage of various data values, for example, application name 410, host name 420, data type 430, port number 440, etc. One or more of these data values may be included in data structure 400. When VPN clients 220, 221 detect that communication is based on (i.e., includes) any of the data values included in data structure 400, the VPN client 220, 221 communicates with server 270 based on parameter setting 450 set forth in data structure 400. By optionally including one or more multiple data values 410, 420, 430, 440 (or others), VPN clients 220, 221 communicate based on parameter setting 450 based on an identification that a specific application is in use or based on other information. For example, the ANDROID operating system includes an API that, when called, provides VPN client 220, 221 with the name of an application in use. Parameter setting 450 may then be used for communication. In other examples, the name of the application in use may not be available to VPN client 220, 221, and VPN client 221 may communicate based on parameter setting 450 after detecting information other than (or in addition to) an application name, such as host name 420 identified in packets between the client and the server, data type of communication in packets between the client and the server, port numbers included in communication between the client and the server, etc. Thus, the data values 410-440 may be used to identify an application and/or alternatively to identify a type of application. Parameter setting 450 is then used for communication between client and server. The value of 450 may be a specific data network parameter type, rate, speed, etc. Parameter setting 450 may be loaded into data structure 400 in operation 350 of FIG. 3.

In an example, VPN client 220 identifies that communication should be based on a specific parameter setting, loads data values 410-440 into data structure 400, identifies parameter setting 450 that optimizes communication for an application (or type of application), and then loads the parameter setting 450 that improves communication into data structure 400. Data values 410-440 and parameter setting 450 are then shared with VPN client 221 at an enhanced version of 350. Thus, while 350 is previously described as changing parameter setting 450 in data structure 400 (with data values 410-440 that were previously stored in data structure 400), 350 may optionally include providing VPN clients 220, 221 with both data values 410-440 and parameter setting 450 that previously were not stored in data structure 400. The data structure may be part of the temporary data file that is shared/created by the VPN with the various clients and their VPN clients. Or, alternatively, the data structure may be part of the application utilized by the VPN client which is updated based on content of the temporary data file.

FIG. 4 relates to the sharing of parameter setting 450 by itself or with data values 410-440. One aspect relates to VPN client 220 (for example) being permitted to transmit parameter setting 450 (with or without data values 410-440) to VPN client 221. Another aspect of FIG. 4 relates to VPN client 221 (for example) being permitted to receive parameter setting 450 (with or without data values 410-440) to VPN client 221.

FIG. 5 relates to a data structure 500 that may be used so that one VPN client can share parameter setting 450 (by itself or with data values 410-440) with another VPN client. As an example, assume VPN client 220 has a parameter setting (or an updated parameter setting) that is to be shared with VPN client 221. There are many examples of situations in which a parameter setting is shared. Examples include sharing parameter settings on a regular basis, sharing parameter settings when parameter settings are updated, receiving a request to share a parameter setting (at the VPN client that is sharing the parameter setting or outside of that VPN client, for example from a VPN server, etc.). The sharing may also occur each time a new optimal setting is identified. Each VPN client may include optional data structure 500 that controls the sharing of parameter settings. Outgoing setting 510 may include a parameter setting that a VPN client shares (or will share) with another VPN client. Incoming setting 520 includes a parameter setting that has been shared from another VPN client. Outgoing enabled 530 permits a VPN client to share outgoing setting 510 with another VPN client. Incoming enabled 540 permits a VPN client to receive a parameter setting from another VPN client (via outgoing setting 510 of the VPN client sending the shared data, for example). Outgoing enabled 530 and/or incoming enabled 540 may be user controlled (via a UI, for example), or controlled elsewhere, such as cloud controlled from a VPN server (or another server). The settings may also be controlled automatically based on the continued optimization process and the identification of new or currently updated optimized settings.

Data structure 500 can be stored in each VPN client, or at another location, such as cloud-based storage (e.g., at a VPN server and/or associated server). The content may be part of a temporary data file that is shared with each entity when attempting to connect to one another or periodically on a scheduled basis.

FIG. 6 relates to a further data structure that may be used to share parameter settings with VPN clients. FIG. 6 illustrates data structure 600 that stores one or more parameters that affect data communication from/to a VPN client. The data structure 600 includes multiple parameters, but this is merely exemplary. Each parameter 610, 620, 630 is associated with a respective data source. Identification of the data source is accomplished by the field marked data source 640. Thus, if communication with a data source is identified, the parameters stored in parameter(s) 610, 620, 630 are used for controlling that communication. As previously explained, the parameters may include header compression, body compression, TCP, UDP, etc. Data source 640 enables identification of a data source, which may include identification data such as source name, IP address, port number, data patterns, etc. Each VPN client may rely on a respective data structure 600. Data structure 600 may be stored in each VPN client, or in a location remote thereto, such as a VPN server (or a server associated with a VPN server), etc.

FIG. 7 relates to a further data structure that may be used to share parameter settings (720, 730, 740) of a particular parameter '1' 710 with VPN clients. Exemplary data structure 700 enables one or more settings associated with each parameter to be identified. In one embodiment, data structure 700 is used in combination with data structure 600. The one or more parameters that affect communication with data source 640 are identified via data structure 600, and parameter setting(s) associated with each parameter 610, 620, 630 are specified in data structure 700. Data structure 700 may be implemented so that one parameter setting is associated with a parameter for each data source or more than one parameter setting is associated with a parameter for each data source. In some situations, more than one parameter setting may be associated with a data source. In other situations, different parameter settings may be used for a parameter that affects communication with a data source based on various exemplary criteria, such as user input, current conditions, etc.

FIG. 8 relates to a further data structure that may be used to share parameter settings with VPN clients. Data structure 800 enables the parameters set forth in data structure 600 and/or data structure 700 to be specified. This exemplary data structure provides flexibility with regard to specifying the parameters and respective settings that affect communication with various data sources. For example, data structure 800 has assigned "compress header" as parameter '1' 810 (exemplary settings include "on" and "off"). "Compress body" has been assigned as parameter 2 820 (exemplary settings include "on" and "off"). TCP has been assigned as parameter 3 830 (exemplary settings include enable/disable TCP protocol). UDP has been assigned as parameter 4 840 (exemplary settings include enable/disable UDP protocol). In this manner, various parameters may be modified for communication with data sources, and there is flexibility with regard to parameters 'N' that are available for modification 850. Data structure 800 may also specify algorithms, subroutines, memory locations, APIs, etc. that are to be accessed/executed when various parameters are used to affect communication.

FIG. 9 illustrates exemplary data structure 900 that may be used for (remote) coordination when sharing parameter settings. Data structure 900 may be, for example, cloud based (although data structure 900 may alternatively or in addition be local to one or more VPN clients). For example, when a VPN client shares a parameter setting (under various exemplary conditions, including it is a new setting, it is shared on a timed basis, the setting has been "pushed" from a VPN client, the setting has been "pulled" by a VPN client, the setting has been manually shared as a result of user interaction with a UI, etc.), the parameter setting may be received by a VPN server (or related) server before being forwarded to one or more other VPN clients. Data structure 900 includes exemplary data fields that may be used to identify respective VPN clients. Exemplary data used to identify a VPN client may be user ID 910 and/or IP address 920. In other words, a VPN client can be identified based on a user ID transmitted by (or recognized by) a VPN client and/or an IP address where the VPN client is located in IP address space. Other forms of identification for each VPN client may also be used. In another example, User IDs are registered when a VPN client is made available (for example, when a user activates/initializes a VPN), and the IP address may be communicated to data structure 900 when the associated VPN client communicates with the (VPN) server where data structure 900 is situated. Data structure 900 is shown including exemplary input receptive 930, which indicates whether the VPN client (with the user ID 910 and/or at the IP address 920) has agreed to receive a shared parameter setting from another VPN client. Exemplary output receptive 940 indicated whether the VPN has agreed to transmit/share a shared parameter with another VPN client (which may be useful if parameter settings are "pulled" from a VPN client). Input receptive parameter 950 may be the parameter setting which is to be transmitted to (or shared with) the specified VPN server. The data in data structure 900 may be redundant with data in VPN clients, or it may be unique (or partially unique).

Thus, using the above data structures, VPN clients are able to share parameter settings with other VPN clients, and such sharing can be managed by the VPN serves depending on the permissions and settings. This feature, for example, enables the settings that result in optimal communication within one VPN server to be used for improving communication with another VPN server. The optimizations relate to many of the parameters that may be measured with regard to network communication, and may include speed, latency, jitter, error rate, etc.

A further exemplary embodiment of the present invention relates to the ability to bypass a VPN when data is being transmitted from a server to a client. This feature is useful if use of a VPN with a client is the "default" configuration, and bypassing the VPN is desired in specific situations, such as when the client is communicating with a particular server or data service.

For purposes of this explanation, the phrase "video streaming" will be used. "Video streaming" may refer to continuous streaming (such as during a live sports event or video conference) or it may refer to "non-continuous" streaming, such as a content service in which data is transmitted in spurts with non-transmission (or less transmission) between the spurts. While video streaming is described, it is understood that the disclosed embodiments may relate to other types of data transfer as well, such as audio streaming, data downloads, etc.

Also, video streaming providers will be described, but the providers may be transmitting other types of data as well.

Video streaming providers provide content (such as movies) on a regional basis. This is because video streaming providers may be licensed to stream content (e.g. movies) in one geographic region but may not be licensed to stream content in another geographic region. One way in which a video streaming provider determines the geographic region that has requested the streaming data is by looking at the IP address from the source that made the request. By looking at the IP address, the source of streaming video data can determine the geographic region from which the request for the streaming data originated. If (for example) a specific movie has geographic region licensing restrictions, the video streaming provider can determine whether it is licensed to stream that movie in the geographic region from which the request for the streaming data originated. Some users attempt to get around these licensing restrictions by using a VPN. When a user uses a VPN to request streaming data, the IP address associated with the VPN is typically different than the IP address associated with the user that is requesting the streaming data. Also, VPN servers can be in many different countries (and with associated IP addresses). Thus, if video streaming provider is not licensed to provide the data to the user in the user's actual geographic region (as identified by the user's IP address), the user can try to reach the video streaming provider via a VPN server that is located in a geographic region that is authorized to receive the requested streaming data. In this manner, if successful, a user is able to "get around" the geographic licensing rules.

Video streaming providers have become aware of this practice of getting around geographic licensing rules and have taken steps to prevent this practice from happening. The way that they prevent this practice from happening is by keeping a list (i.e., a deny list) of IP addresses associated with VPN servers. In this manner, if a video streaming provider receives a request to stream data from an IP address on the deny list, the video streaming provider simply refuses to stream data to that address.

Figure 10:
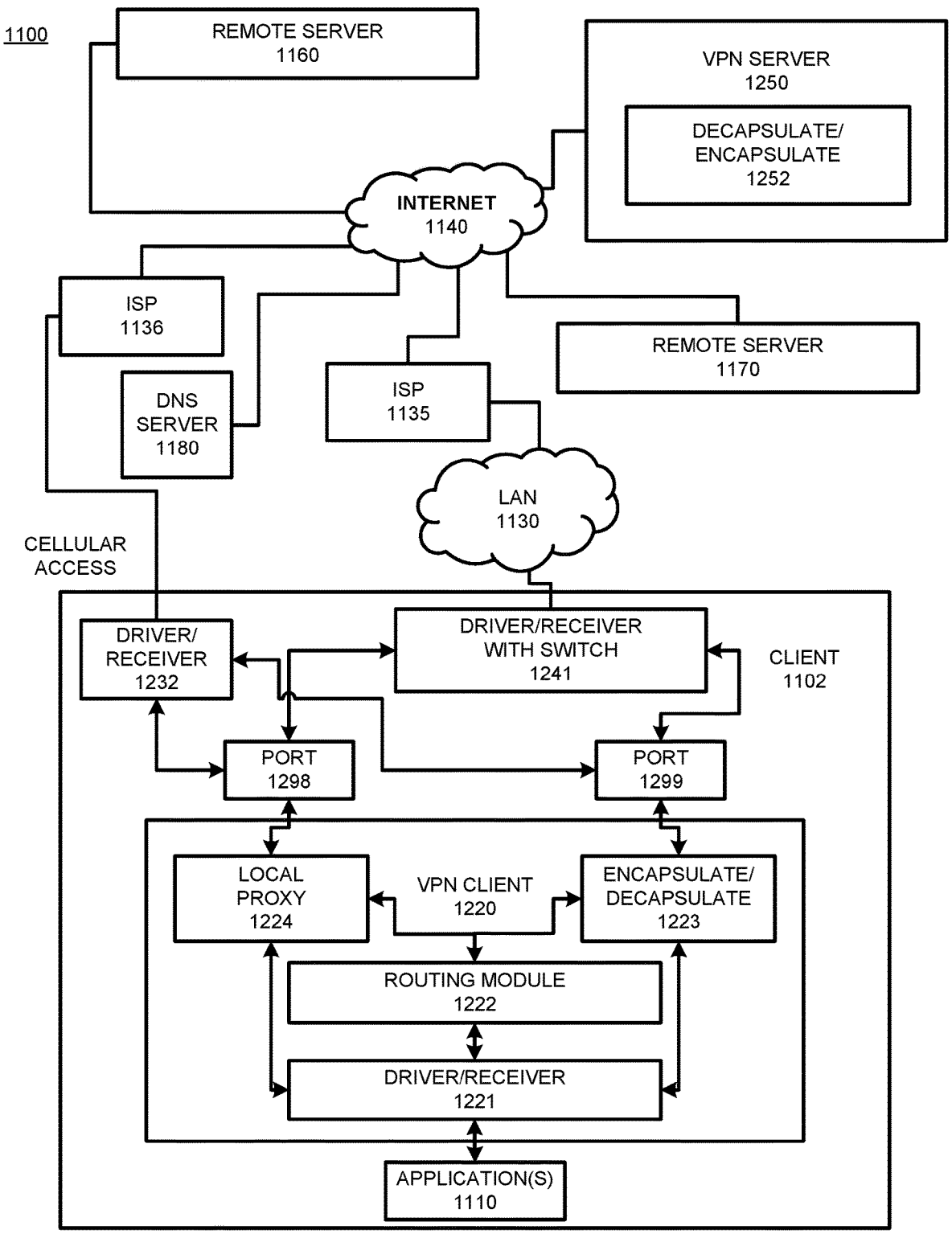
FIG. 10 is a network diagram of a client device operating in a VPN network environment according to an exemplary embodiment of the present invention.

FIG. 10 illustrates a network 1100 communicating with the network via a VPN client. Initially, FIG. 10 illustrates that client 1102 desires to communicate with remote server 1160. As shown, client 1102 may be, for example, a mobile communications device that wirelessly communicates with the network via one or more access points (that may include Ethernet, modem, cellular, Wi-Fi, etc.). ISP 1135 and ISP 1136 may each permit public access or restricted access. As an example, ISP 1135 may include a communications network that is typically accessed over a wired connection, while ISP 1136 may include a communications network that is accessed by cellular communications provider. Alternatively, or in addition, an ISP may be provided that permits both forms of communication and perhaps another form of communication. ISP 1135 and ISP 1136 are shown coupled to Internet 1140 through communication protocols that are well known to one of ordinary skill in the art. In one example, ISP 1135 and ISP 1136 interface with Internet 1140 via a fiber-optic or Ethernet Internet connection.

While in one example ISP 1136 is accessed by a cellular access point, ISP 1136 may be accessed via other methods alternatively or as well, such as a LAN (e.g., a wireless home network), a combination of wired and/or wireless connections, and perhaps one or more intervening networks (such as a wide area network) so that access to Internet 1140 may be obtained.

In the example above, a user may use client 1102 for voice communication. Assume client 1102 is a cell phone such as a smart phone, and communication occurs via a Voice over IP (VoIP) application. Client 1110 communicates with ISP 1135, ISP 1136, or both (alternatively or simultaneously using technology such as channel bonding) via one or more access points, and a digitized form of the user's voice is then transmitted to Internet 1140. From Internet 1140, the data that represents the user's voice is transmitted to remote server 1170. From remote server 1170, the data may be transmitted to another user (not shown) so that voice communication between the two users may occur.

In another embodiment, a user may use client 1102 for secure voice communication. Data from application 1110 enters VPN client 1220 via driver/receiver 1221. Voice communication data is encapsulated (which may or may not include encryption) via encapsulate/decapsulate (encap/decap) module 1223. Encapsulated data is then transmitted to ISP 1135 (and/or ISP 1136) via one or more access points before reaching Internet 1140. From Internet 1140, the encapsulated data (i.e. the encapsulated voice communication data) is transmitted to VPN server 1250. Data is then decapsulated (which may or may not include decryption) via decapsulate/encapsulate (decap/encap) module 1252 before being retransmitted to Internet 1140 and remote server 1170. From remote server 1170, the data may be transmitted to another user (not shown) so that voice communication between two users may occur via a VPN.

In another embodiment, client 1102 streams video data from remote server 1160. Client 1102 requests the video data from remote server 1160 by transmitting a request through ISP 1135 (and/or ISP 1136) and Internet 1140. Remote server 1160 responds to the request by transmitting video via Internet 1140, and back to ISP 1135 (and/or ISP 1136), so that it is eventually received by client 1102. Such video streaming occurs outside of a VPN. The request to stream data may or may not be proceeded by a DNS request to provide the IP address of remote server 1160

In yet another example, remote server 1160 serves two purposes: first, it is used as the source of streaming data (inside or outside a VPN) and second, it is used in combination with data that has been transmitted via the VPN.

In another example, data is transmitted via a VPN, and further data is transmitted outside of the VPN (or outside of the VPN on another VPN). The data may be transmitted to at least two different servers (a remote server and a VPN server). Alternatively, the data transmitted via the VPN and outside of the VPN (or outside on another VPN) may be transmitted to the same server.

In the above description, when the phrase "outside of the VPN" is used, this may include non-encapsulated/unencrypted data (i.e., data not encapsulated/encrypted by a VPN) and/or encapsulated/encrypted data that has been encapsulated/encrypted by another VPN.

Turning back to FIG. 10, application(s) 1110 participate in communications that include Internet 1140. In particular, application(s) 1110 participate in communications that include VPN client 1220. At least one type of communication that includes VPN client 1220 also includes encapsulation/encryption. At least another type of communication that includes VPN client 1220 omits encapsulation/encryption (at least by VPN client 1220). First, a description is provided of communication that includes VPN client 1220 and that omits encapsulation/encryption (at least by VPN client 1220). VPN client 1220 includes driver (driver/receiver) 1221 that receives data from one or more applications 1110. Driver 1221 may be, for example, a TUN/TAP driver.

A request for data (such as a request for data streaming) to be returned to application 1110 (or the act of providing data) is transmitted from driver 1221 and is received by routing module 1222. The purpose of routing module 1222 is to determine whether the request for data will be encapsulated (for purposes of being transmitted via the VPN) or whether the request for data will be transmitted to local proxy 1224 and not encapsulated (at least within VPN client 1220). In addition, when the request for data that is transmitted via the VPN arrives at its destination, the destination is advised that the source of the data was a VPN server (and not the actual source of the data) because the destination receives the IP address of the VPN server as the source, and client 1102 (the actual source of the data) may be hidden to the destination as the destination will only "see" the IP address associated with the VPN server. By contrast, when a request for data that is not transmitted via the VPN arrives at its destination, the destination "sees" that the source of the data was client 1102. Among other things, when the request for data (or data, itself) has been received by routing module 1222, routing module 1222 directs the request in one of two separate directions depending upon user selection.

The first scenario to be described is with a VPN enabled. When a VPN is enabled, routing module 1222 routes the request for data to VPN server 1250 via encap/decap 1223. From VPN server 1250, the request for data is further forwarded depending upon whether or not the request for data is a DNS request. If the request for data is a DNS request, VPN server 1250 routes the request to DNS server 1180 (because the IP address of the DNS server is in the packet header as the destination). If the request for data is a data (non-DNS) request, VPN server 1250 routes the request to remote server 1160 (when the IP address of remote server 1160 is in the packet header as the destination). If the request is received by DNS server 1180, DNS server 1180 resolves the DNS request and transmits the corresponding IP address to VPN server 1250. VPN server 1250 then transmits the IP address via switch 1241 and port 1299 to encap/decap 1223. The IP address is subsequently transmitted to driver/receiver 1221 and back to application 1110 that initiated the DNS request. If the request is received by remote server 1160, remote server 1160 responds to the request by transmitting data (e.g. streaming data) via switch 1242 and port 1298 to local proxy 1224. The data is subsequently transmitted to driver receiver 1221 and back to application 1110 that initiated the data request.

For purposes of explanation, a data request (i.e. to stream video data) will be broken down into two separate steps (as an example). The first is a DNS request to a DNS server (to obtain the IP address associated with a domain name of a server where requests for streaming data are serviced). The second is an IP request or the "data fetch" (in which the IP address obtained from the DNS request is used to request that a server provide data). In some situations, the first is not performed because the IP address is already available for the data fetch. This situation may occur if the IP address associated with a domain name has been cached.

More specifically, when application 1110 requests data from a remote server 1160, there are actually several steps that may be involved. Some of these steps may, however, be omitted (for example, if IP addresses corresponding to domain names are cached). The first is "DNS resolution" in which application 1110 requests data from a remote server with an associated domain name. Before the request for data can be sent to the remote server, however, the domain name needs to be "looked up" on a DNS server 1180 to identify the IP address of the remote server. The second is the "data fetch" in which, after the IP address of the remote server has been identified by the DNS server, the remote server is communicated with based on its IP address to provide the data that is sought. In some situations, the first is omitted. Each of these operations includes two sub operations: a) application 1110 makes a request (which is forwarded to a DNS server in the first and to the remote server in the second step), and b) the server that is being communicated with (a DNS server in the first and the remote server in the second step) responds to a request and provides data to application 1110.

Figure 11:
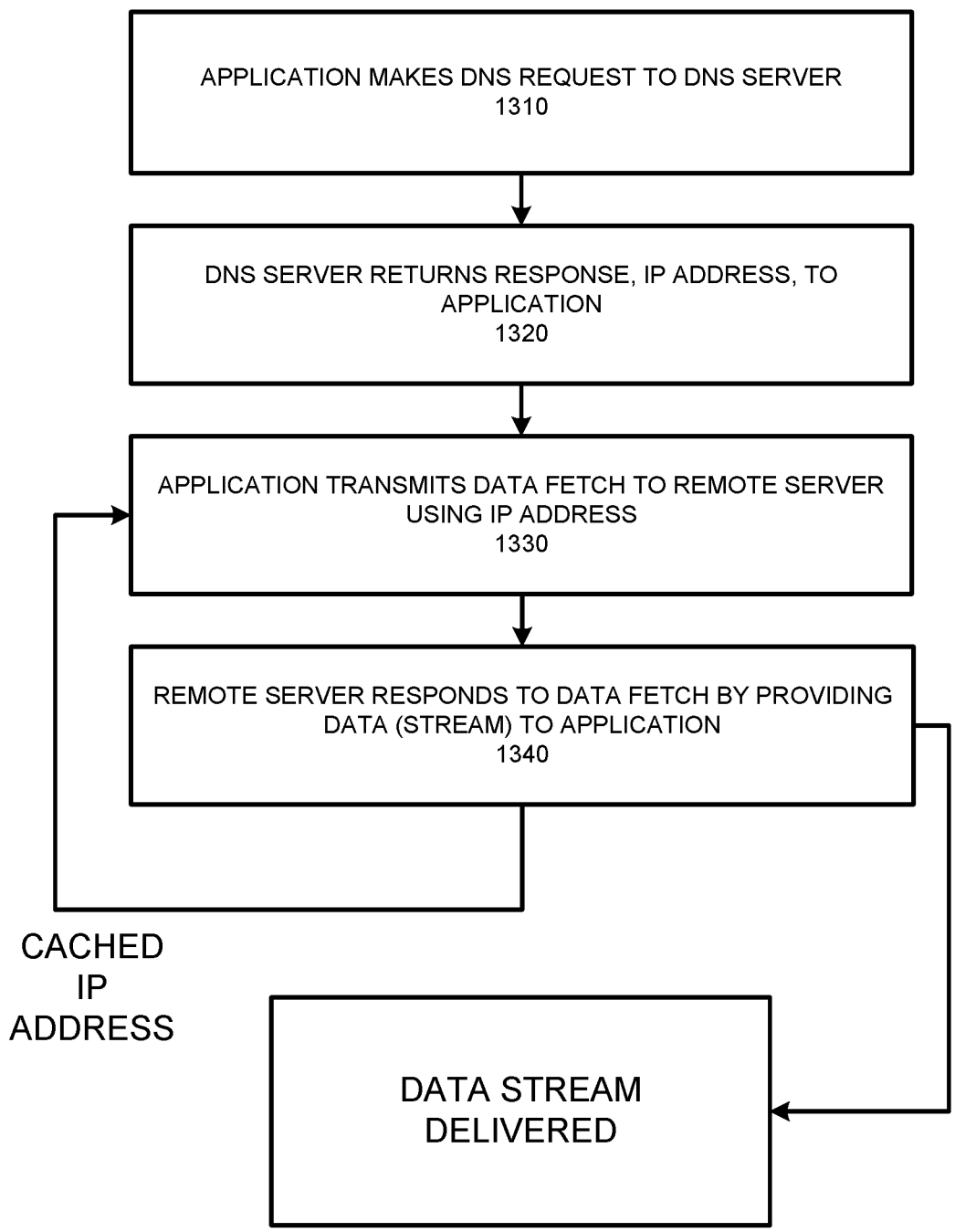
FIG. 11 is a flow chart diagram that illustrates operations associated with a remove server providing data (stream) to a client.

Thus, there are four steps (or two steps if the first two steps are omitted) as illustrated in the flow chart diagram 1300 included in FIG. 11: 1310: application 1110 makes a DNS request to the DNS server, 1320: the DNS server returns the IP address of remote server 1170 to application 110, 1330: the application transmits the data fetch to remote server 1170 using IP address obtained in 1320, 1340: the remote server 170 responds to the data fetch by providing data (or streaming data) to application 1110.

In one embodiment, prior to 1310, a plurality of names of data sources are aggregated in a display to a user, and a user selects from the aggregation which data sources are to be transmitted on the VPN, and which data sources are to bypass (i.e., go around) the VPN. The user then selects from the aggregation whether the data sources listed transmit data through or around the VPN. This embodiment can be implemented in various exemplary manners with regard to the DNS request and the subsequent data fetch. For example, when a data source is not selected for VPN bypass, the DNS request and the subsequent data fetch can be transmitted through the VPN. As an alternative, the DNS request may not go through the VPN, but the data fetch does go through the VPN. As a further example, when a data source is selected for bypass, both the DNS request (if the IP address is not cached) and the subsequent data fetch can be transmitted outside of the VPN.

If a DNS request has been resolved, VPN client 1220 receives the IP address from DNS server 1180 in response to the DNS request and, in one embodiment, returns the IP address to Application 1110 in the manner in which the DNS request was made to DNS server 1180. For example, if the DNS request was made via a VPN, then the IP address obtained when resolving the DNS request is delivered to Application 1110 via a VPN. Conversely, if the DNS request was made outside of a VPN, then the IP address obtained when resolving the DNS request is delivered to Application 110 outside of a VPN. A combination of making the DNS request and receiving the IP address over different routes is also contemplated.

To achieve the above objective, IP addresses received from a DNS server are transmitted through Internet 1140, ISP 1135 (or 1136), and an intermediate (e.g., cellular access point, LAN 1130, etc.) to driver/receiver 1232 before reaching VPN client 1220. From there, the driver/receiver 1241 receives the IP address from DNS server 1180 and passes the IP address to application(s) 1110.

If the DNS request was transmitted via a VPN (i.e., VPN bypass not enabled), then the IP address provided in response may travel along the tunnel used for the DNS request, and the IP address is forwarded to encap/decap 1223 for decapsulation. After being decapsulated, the IP address is delivered to application 1110 via driver/receiver 1221. Conversely, if the DNS request was transmitted outside of a VPN (i.e., VPN bypass enabled), then the IP address may be transmitted along the tunnel used for the DNS request to local proxy 1224, before delivering the IP address to driver/receiver 1221 and application 1110 (without performing decapsulation).

As explained below, when the DNS request returns an IP address, that IP address may be stored in VPN client 1220, along with the domain name that resolved to that IP address. In this manner, the IP address and its associated domain name are cached, and subsequent requests to obtain data from a server based on a domain name may be satisfied without needing to go to a DNS server for resolution. Application 1110 may be any application that is executing on client 1102. Exemplary applications include browsers and Apps (or combination thereof).

After a domain name has been resolved, or if the IP address is already known, a data request from application 1110 is received by remote server 1160, and remote server 1160 desirably includes the data that is requested by application 1110. In an exemplary embodiment of the present invention, the requested data is streaming data. "Streaming" data may refer to data that is continually provided to the user requesting the data. In a further exemplary embodiment of the present invention, the requested data is video streaming data from a video streaming provider. Such data is typically provided to a requesting device in large chunks, with pauses in transmitting the data between the large chunk transmissions. "Streaming" may also refer to "real time" streaming in which data is continuously being transmitted to a requesting user. Examples of real time streaming include live sports broadcasts and group video meetings.

Many video streaming providers do not wish to communicate with a client over a VPN for reasons previously explained. Since, in accordance with an exemplary embodiment of the present invention, remote server 1160 was contacted outside of a VPN, remote server 1160 desirably responds to the request from application 1110 with requested video streaming data (assuming there is a valid account, and other requirements of the commercial video streaming servers have been met). Remote server 1160 transmits the streaming data through Internet 1140, to local proxy 1224, through driver/receiver 1221, and back to application 1110.

Thus "outside of the VPN" may be used to contact the video streaming provider from an IP address that is not associated with a VPN server. The video streaming provider may maintain an "permitted" list or "prohibited" list of IP addresses and may refuse to stream video if contacted by a VPN server with an IP address that is blocked by either list. While VPN client 1220 that is active may (by default) transfer traffic through a VPN, the use of a "VPN bypass" may selectively result in data transfer associated with streaming video occurring outside of the VPN. In this manner, a user is able to stream video from a provider that may refuse to stream video through a VPN, while other communication with the user occurs within the VPN. Communication in this explanation may occur with remote server 1160, remote server 1170, and/or some other server to which client 1102 and/or application 1110 has access.

As another example, application 1110 transmits data that a user wishes to have transmitted, and/or receives data that a user wishes to receive, through the VPN. Accordingly, the data request from application 1110 is received by driver 1221 and is then passed to routing module 1222. The data transmission is transferred from routing module 1222 to encap/decap module 1223. As the data is now encapsulated (and possibly encrypted), encapsulated data is transmitted to VPN server 1250 via Internet 1140 (and appropriate intermediate points). At VPN server 1250, the data is decapsulated (which may also include decryption) via decap/encap module 1252 and forwarded via Internet 1140 to the destination server (i.e., remote server 1170). Remote server 170 responds to the request by transmitting the response with the requested data via Internet 1140 to VPN server 1250. The data enters decap/encap module 1252 where it is encapsulated. VPN server 1250 encapsulates the data and transmits the data to encap/decap module 1223 via Internet 1140. Encap/decap module 1223 decapsulates the data, and transmits the decapsulated data to receiver 1221, and then to application 1110 from which the original request for the response originated.

One example method of operation may include providing multiple VPNs and the different settings of a selected network operating parameter can be used to select different VPN servers, and each of the different settings corresponds to different VPN servers, respectively, each having a respective IP address, and during the changing, communication is attempted between one of the clients, and one of the servers until communication is attempted with the setting, and at another of the settings, communication is attempted with one of the VPN servers, and communication does not occur, and at the setting, communication is attempted with another of said VPN servers, and communication does occur.

The parameter may be used to compress message bodies or headers in the communication stream. The parameter can be used to transfer data with an application via TCP or UDP or other communication protocols. The communication may be for a streaming service. The communication is with a data source, a name is associated with the data source, the name is identified, and the name is displayed to a user, the user selects the name, and transfer of data with another of the VPN servers occurs responsive to the user selecting the name. The settings may result in an increased rate of communication compared to another setting, such as a higher data rate.

Another example process may include establishing a VPN with a client, and a plurality of VPN servers are available with each having a respectively different IP address, attempting to stream data from the server to the client over one of the VPN servers, and the server is associated with a streaming service, detecting whether the server streams data to the client over one or more of the VPN servers, detecting a quantity of data transmitted from the server to the client in a time period, recording one or more servers from which one or more of the VPN servers receives the data which is streamed, displaying availability of the streaming service for other clients, and initiating streaming via one of the available servers when initiated by any of the other clients. Also, identifying identification data associated with the source, such as host name, application name, domain name, IP address, port number and SNI, and displaying at least one of the name and the identification data to a client device.

As explained above, VPN client 1220 reviews outgoing data requests (and/or incoming responses to data requests) to determine if a streaming service selected for VPN bypass has been contacted. As one example, if the data request initially was through the VPN, but the detection of a streaming service selected for bypass does not occur until after the data request is responded to, the VPN can then be bypassed, and subsequent communications between client 1102 and the server (providing the streaming) can occur outside of the VPN. This feature may also be available before the data request is responded to (or before the data request is received by the server that will transmit the streaming data), to ensure that the server does not reject the request to stream video data.

VPN client 1220 can maintain a list of data associated with each streaming service in a name column. Upon detecting any of that data (in a data request or response), and after a streaming service has been selected as a bypass, VPN client 1220 can bypass communication with the streaming service to outside of the VPN. Exemplary data may include, host name, URL, IP address, SNI, port number, or other information included for example in data request headers (or other parts of the packets). Exemplary further data may include the name of the application making the data request (or receiving the response to the data request). For example, in ANDROID, the operating system has an API that can be called, which is given an IP address and a port from a packet, and that can return the package name (application name) that created the socket. The returned package name can be used to bypass the VPN for that application, if selected for bypass. Thus, the above exemplary data can be used to control VPN bypass of a streaming data source that is on the list, and/or the above exemplary data can be used when the streaming data source is not on the list, but VPN client 1220 is requesting (or is instructed to request) streaming data from the streaming data source, and the streaming source is subsequently placed on a user interface so that bypass control is available.

In a further exemplary embodiment of the present invention, a user of a client enters, into the client, information regarding a video streaming source that is to be selectively bypassed. Thus, after the user provides information regarding the streaming source, a name of the streaming source can appear in a user interface, and the user can select whether that streaming source is to bypass the VPN. This feature may be useful if a user desires to have VPN bypass capability for a particular streaming source.

In a further exemplary embodiment, the streaming source(s) that is to bypass the VPN is identified by a means other than a user interface. In one example, the streaming source(s) is identified from a configuration file that is received by (or generated by) the client. In such a situation, the user interface may be included or the user interface may be excluded. In another situation, the streaming source(s) is identified in another manner, such as by collecting the name of the streaming source(s) from another application running on the client, such as from a browser or a messaging application. By the client noting mention of the streaming source elsewhere, the client can load the name of the streaming source (and/or information relating to the streaming source) into a configuration file from which the source is bypassed. Alternatively, the client includes (or has access over cloud data transfer, for example) to a look-up table to translate the name of a streaming source to the data (e.g., IP address) that is desirable in order to have the streaming source bypass the VPN. This information may be displayed to a user or omitted from view.

Figure 12:
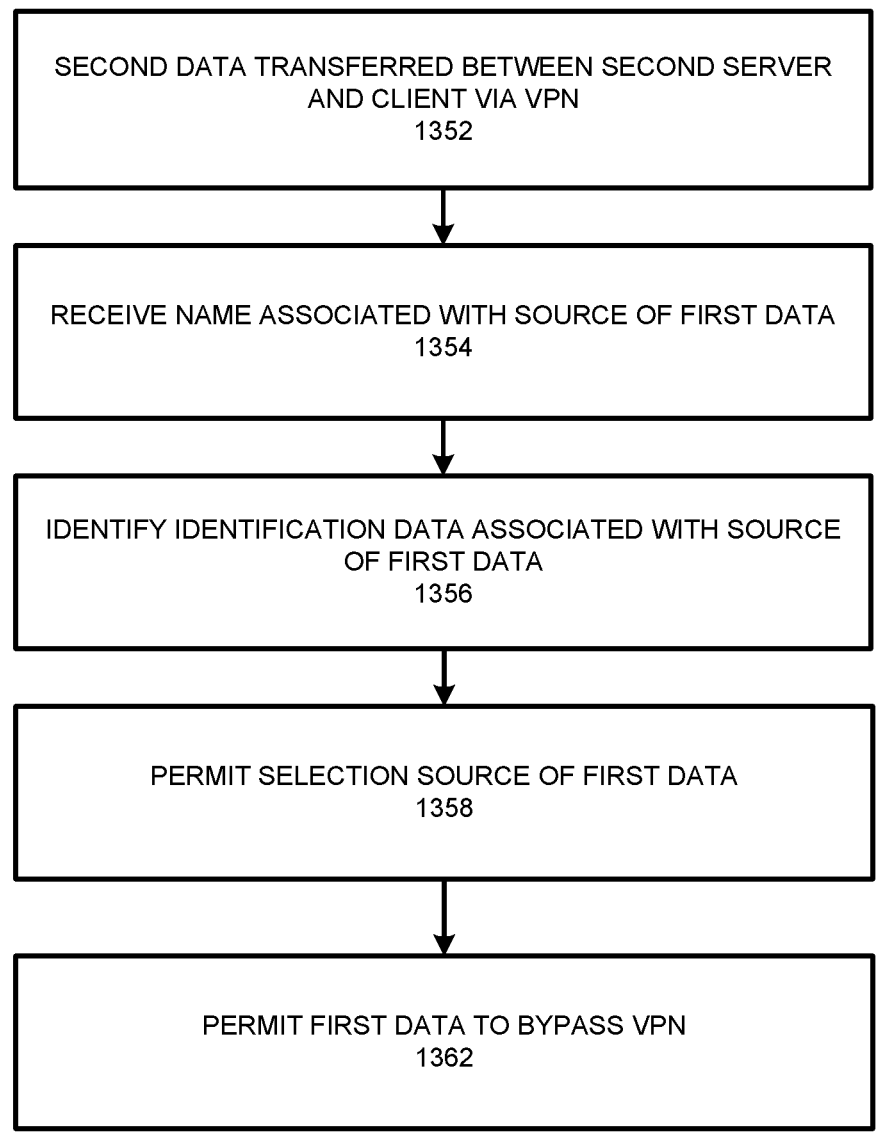
FIG. 12 is a flow chart diagram that illustrates data bypassing a VPN.

An exemplary embodiment of the present invention is illustrated in the flow chart diagram 1350 of FIG. 12. In the example illustrated in FIG. 12, data transferred between a first server and a client will bypass a VPN, while data transferred between a second server and a client will be transmitted with the VPN.

At 1352, second data is transferred between the second server and the client via the VPN.

At 1354, a name associated with a source of first data is received. An exemplary name is a name associated with a video streaming service. The name may be received, for example, by a client that will be (or is) in communication with a (first) server that hosts the content of those video streams. The name may be entered on a keypad or other I/O device. The name may be entered via a user interface. The name may be entered remotely and provided to the client at a later time.

At 1356, identification data is identified that is associated with the source of first data (e.g., the first server). The identification data may be identified in many different ways. In one example, the identification data is identified by entering the name into a search engine. The search engine may be an Internet search engine. The search engine may be a search engine that searches through data on a public or private database. The database may alternatively be stored in a server that is in contact with the client that will implement the VPN bypass. The server may be a VPN server or some other server. The search engine may search based on the name entered at 1354. The search engine may provide the search results to the user that entered the name and ask the user to verify which of the search results (if any) correspond to the entered name.

After identification data is identified, the identification data may be stored in a database for future use. In a further embodiment, the identification data may be stored in a database local to the client. In another embodiment, the client shares the identification data with other clients. In another embodiment, the data is shared from the client. In another embodiment, the data is uploaded from the client to a server (such as a VPN server), and the data is shared from the server to other clients (as a data "push", a data "pull" or combination thereof).

In an exemplary embodiment of the present invention, the client that will be performing the selective VPN bypass described above (or the VPN client that will be performing the selective VPN bypass described above) builds a table of identification information that will be used to permit a data source (i.e., server) to bypass the VPN. In another exemplary embodiment, the table is built elsewhere, and then imported into the client (or the VPN client) for the client's use. In another embodiment, the table is cloud based, and the client accesses the table from the cloud via a cloud-based server. In another embodiment, multiple clients (or VPN clients) share a table that is stored in one or more clients. Such a table includes various types of information associated with respective streaming sources. Exemplary data in the table may include host name, URL, IP address, SNI, port number, application name, or other information included for example in data request headers (or other parts of the packets). Exemplary further data may include the name of the application making the data request (or receiving the response to the data request). For example, in ANDROID, the operating system has an API that can be called, which is given an IP address and a port from a packet, and that can return the package name (application name) that created the socket. The returned package name can be used to bypass the VPN for that application, if selected for bypass. Thus, the above exemplary data can be used to control VPN bypass of a streaming data source that is on the list, and/or the above exemplary data can be used when the streaming data source is not on the list, but is being added to the list.

In a further embodiment, potential table entries are pushed from an external location and into a table, wherever the table that is accessed by the client (or VPN client) might be located. The external location may be a cloud server, a VPN server, other clients, etc. The table may be located in the client, the VPN client, a cloud server, a VPN server, etc. In another embodiment, the table is updated wherever it might be (in a first VPN client, for example) and a second VPN client reaches out to the first VPN client for the data stored in the table, or to decide whether to bypass the VPN based on the information in that table.

In one embodiment, multiple VPN servers have local copies of table data, and as they acquire table data, the table data is pushed to a central data repository. Clients (or VPN clients) make decisions whether to bypass the VPN based upon the information in that central repository.

Table entries can come from multiple sources. They can be obtained "on demand" when a user enters the name of a data source into a user interface, and the client searches for the table entries associated with the data source (as explained above by using a search engine and/or monitoring the data attributes associated with a data transfer). They can be obtained from other clients or data repositories based on the searching or monitoring that those other clients perform. They can be obtained from researching various data transfer services, obtaining the results of that research, and storing the results in a location where it can be obtained by a client, etc. They can be obtained by a user identifying a data transfer that is in progress, or that is being attempted, and the attributes of that particular data transfer are stored in the above table. These various options are merely exemplary.

Once a data source for VPN bypass has been identified, that data source can then be selected for VPN bypass at 1358. Alternatively, the data source can be selected by an executable file downloaded or pushed to the client (or VPN client). In that situation, the data source is selected for VPN bypass, and the user may or may not be aware that VPN bypass for that data source is active. At 1362 the selected data source is subjected to VPN bypass.

In an exemplary embodiment of the present invention, what is being bypassed is not (or is not only) data from a specific data source but data from a specific type of data source. In particular, a user may wish to have the option to bypass data with certain characteristics, such as data associated with a certain port number. Accordingly, the user may enter into a user interface a description of the type of data transfer for which VPN bypass is desired, along with the associated data (e.g. port number). Alternatively, this information can be pulled or pushed from an external data source.

The above examples have included bypass of a VPN, but it is understood that bypass of another form of processing of data is contemplated. Exemplary bypassing may include encrypted data bypassing, data over a certain type of connection (Wi-Fi, cellular) bypassing, data through a particular server or IP address bypassing, etc.

Figure 13:
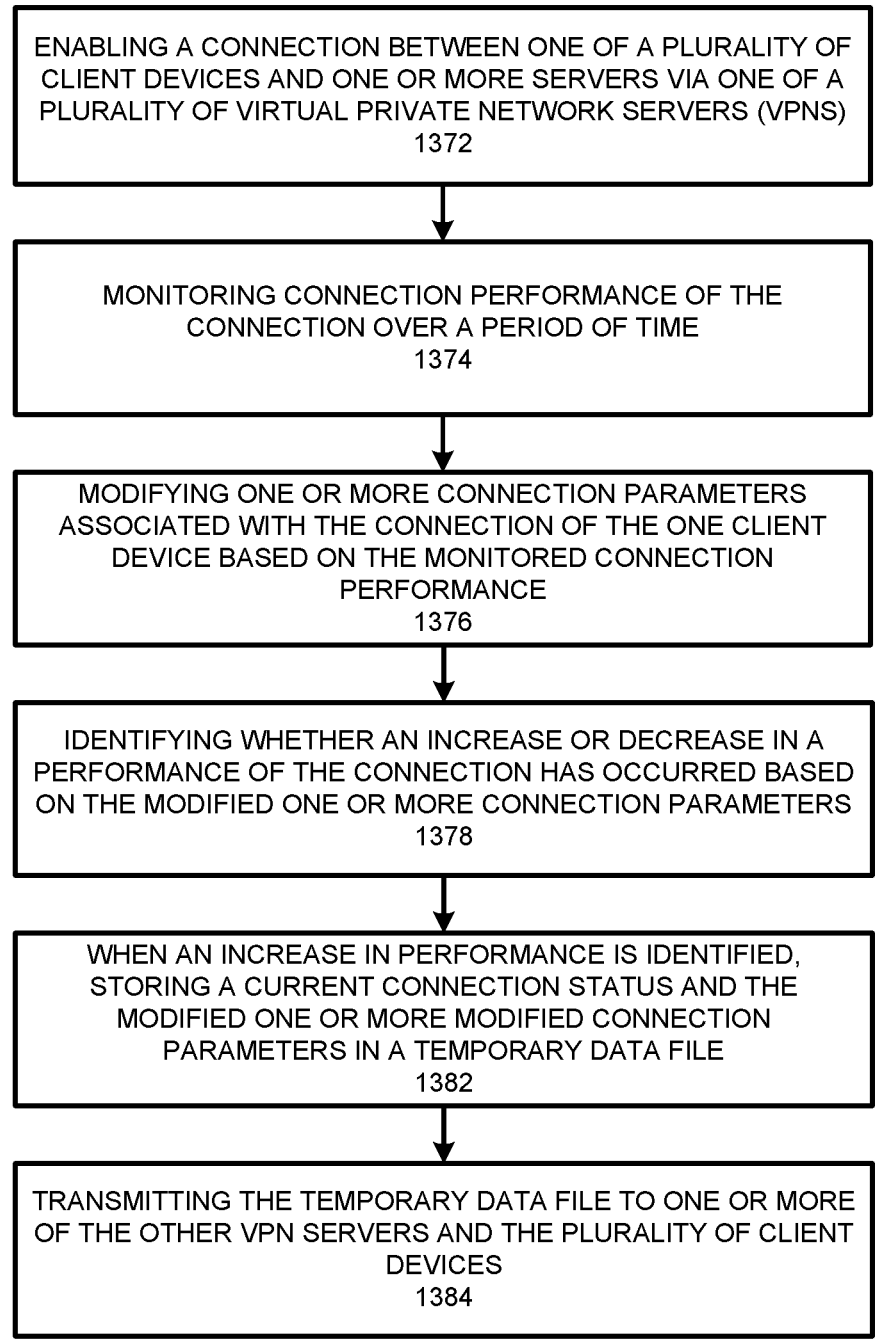
FIG. 13 is a flow chart diagram that illustrates an example process according to exemplary embodiments.

FIG. 13 illustrates a flow diagram 1370 of a VPN selection process. In an example of VPN selection, a process may include enabling a connection between one of a plurality of client devices and one or more servers via one of a plurality of virtual private network servers (VPNs) 1372, monitoring connection performance of the connection over a period of time 1374, modifying one or more connection parameters associated with the connection of the one client device based on the monitored connection performance 1376, identifying whether an increase or decrease in a performance of the connection has occurred based on the modified one or more connection parameters 1378, when an increase in performance is identified, storing a current connection status and the modified one or more modified connection parameters in a temporary data file 1382, and transmitting the temporary data file to one or more of the other VPN servers and the plurality of client devices 1384.

The process may also include when a client device request to connect is received from any one of the plurality of client devices and by any one of the plurality of VPN servers, forwarding the temporary data file to the requesting client device, applying one or more of the modified connection parameters to the requesting client device that sent the request, and forwarding a new request to a different VPN server than the VPN server that received the request based on the applied one or more modified connection parameters. The providing streaming content from the one or more servers via the different VPN server to the requesting client device may be performed by applying the one or more modified connection parameters. The monitoring the connection performance of the connection over a period of time includes identifying one or more connection thresholds are not exceeded for the period of time prior to applying the modified one or more connection parameters to the connection. The transmitting the temporary data file to one or more of the other VPN servers and the plurality of client devices includes transmitting the temporary data file to a first VPN among the VPN servers, and when the first VPN is monitored for the period of time and performance of a connection associated with the first VPN has increased, transmitting the temporary data file to all remaining VPN servers of the plurality of VPN servers. Also, determining an application operated by the one client device that utilizes the connection, when a decrease in performance is identified, storing a current connection status and the modified one or more connection parameters in a temporary data file that identifies the other VPNs of the plurality of VPN servers, transmitting the temporary data file to one or more of the other VPN servers and the plurality of client devices, and attempting to connect to a different VPN server while using the application on the client device.

The above examples provide numerous improvements to technology because a VPN can be the default setting that is used by a client, and exceptions can automatically bypass the VPN. In this manner, for example, data can be streamed from streaming sources that do not permit their data to be streamed through a VPN.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Virtual private network (VPN) device/server may indicate any similar system that encapsulates packets to transmit them to and from a client device and to and from a remote server. For example, a VPN may be a software defined network (SDN) or SD wide area network (SD-WAN), or a multi-path TCP (MPTCP) proxy device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

A data storage device may include a machine-readable storage medium (or more specifically a computer-readable storage medium) having one or more sets of instructions embodying any one or more of the methodologies of functions described herein. The data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is illustrated in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Figure 14:
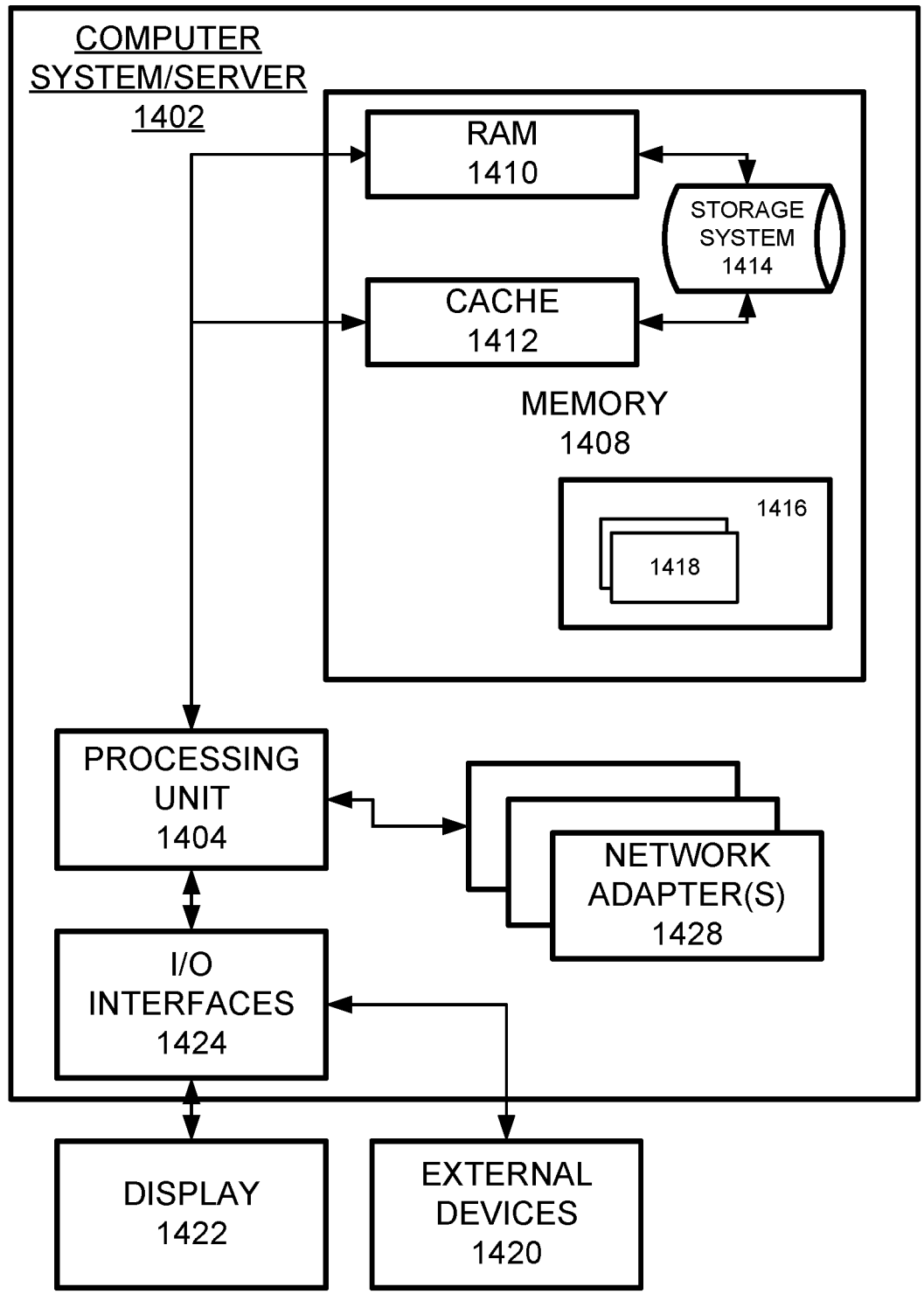
FIG. 14 is an example computer network system or entity configured to store and execute instructions associated with the exemplary embodiments.

FIG. 14 is a computer readable medium and corresponding system configuration of an example device(s) configured to perform one or more operations associated with exemplary embodiments of the present invention.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 14 illustrates an example network entity device configured to store instructions, software, and corresponding hardware for executing the same according to example embodiments. FIG. 14 is not intended to suggest any limitation as to the scope of use or functionality of embodiments of the application described herein. Regardless, the computing node 1400 is capable of being implemented and/or performing any of the functionality set forth hereinabove.

In computing node 1400 there is a computer system/server 1402, which is operational with numerous other general purpose or special purpose computing system environments or configurations. Examples of well-known computing systems, environments, and/or configurations that may be suitable for use with computer system/server 1402 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 14, computer system/server 1402 in cloud computing node 1400 is displayed in the form of a general-purpose computing device. The components of computer system/server 1402 may include, but are not limited to, one or more processors or processing units 1404, a system memory 1406, and a bus that couples various system components including system memory 1406 to processor 1404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media. System memory 1406, in one embodiment, implements the flow diagrams of the other figures. The system memory 1406 can include computer system readable media in the form of volatile memory, such as random-access memory (RAM) 1410 and/or cache memory 1412. Computer system/server 1402 may further include other removable/non-removable, volatile/non-volatile computer system storage media. By way of example only, storage system 1414 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1406 may include at least one program product having a set (e.g., at least one) of program modules that are configured to carry out the functions of various embodiments of the application.

Program/utility 1416, having a set (at least one) of program modules 1418, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. Program modules 1418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1402 may also communicate with one or more external devices 1420 such as a keyboard, a pointing device, a display 1422, etc.; one or more devices that enable a user to interact with computer system/server 1402; and/or any devices (e.g., network card, modem, etc.) that enable computer system/server 1402 to communicate with one or more other computing devices. Such communication can occur via I/O interfaces 1424. Still yet, computer system/server 1402 can communicate with one or more networks such as a local area network (LAN), a general wide area network (WAN), and/or a public network (e.g., the Internet) via network adapter(s) 1426. As depicted, network adapter(s) 1426 communicates with the other components of computer system/server 1402 via a bus. It should be understood that although not displayed, other hardware and/or software components could be used in conjunction with computer system/server 1402. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with operations in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:

1. A method comprising:
enabling a connection between a client device and one or more servers via a virtual private network (VPN) server, wherein the connection is established to have a specific data rate based on a type of application used by the client device;
monitoring, via the VPN server, connection performance of the connection over a period of time for the application used by the client device;
modifying one or more connection parameters of the connection including one or more of a data rate, data compression, a packet type and a protocol used on the connection;
identifying, via the VPN server, whether an increase or decrease in a performance of the connection has occurred based on the one or more modified connection parameters;
when an increase in performance is identified, storing, via the VPN server, a current connection status and the modified one or more modified connection parameters in a temporary data file, wherein the increase in performance is identified based on a determination connection has maintained a data rate above a minimum data rate threshold and has not exceeded a packet loss threshold for a period of time while using the application;
determining, via the VPN server, another client device communicating with the VPN server is using a same type of application as the client device;
forwarding, via the VPN server, the temporary data file to the another client device; and
receiving, via the VPN server, data from the another client device in a communication session between the VPN server and the another client device, wherein the one or more modified connection parameters are used to update a data structure associated with the same application used by the another client device in the communication session to optimize communication between the another client device and the VPN server while using the same type of application.

2. The method of claim 1, comprising
when a client device request to connect is received by the VPN server, forwarding the temporary data file to the requesting client device.

3. The method of claim 2, comprising
applying one or more of the modified connection parameters to the requesting client device that sent the request; and
forwarding a new request to a different VPN server than the VPN server that received the request based on the applied one or more modified connection parameters.

4. The method of claim 3, comprising
providing streaming content from the one or more servers via the different VPN server to the requesting client device by applying the one or more modified connection parameters.

5. The method of claim 1, comprising transmitting the temporary data file to another VPN server among a plurality of other VPN servers, and wherein when the another VPN server is monitored for the period of time and performance of a connection associated with the another VPN server has increased, transmitting the temporary data file to all remaining VPN servers of the plurality of other VPN servers.

6. The method of claim 1, comprising
when a decrease in performance is identified by the client device, storing a current connection status and the modified one or more connection parameters in the temporary data file;
transmitting the temporary data file to one or more other VPN servers and other client devices; and
attempting to connect to a different VPN server while using the application on the client device.

7. A virtual private network (VPN) server comprising:
a processor configured to
enable a connection between a client device and one or more servers via the VPN server, which establishes the connection to have a specific data rate based on a type of application used by the client device;
monitor connection performance of the connection over a period of time for the application used by the client device;
modify one or more connection parameters of the connection including one or more of a data rate, data compression, a packet type, and a protocol used on the connection;
identify whether an increase or decrease in a performance of the connection has occurred based on the one or more modified connection parameters;
when an increase in performance is identified, store a current connection status and the modified one or more modified connection parameters in a temporary data file, wherein the increase in performance is identified based on a determination the connection has maintained a data rate above a minimum data rate threshold and has not exceeded a packet loss threshold for a period of time while using the application;
determine another client device communicating with the VPN server is using a same type of application as the client device;
forward the temporary data file to the another client device; and
receive data from the another client device in a communication session between the VPN server and the another client device, wherein the one or more modified connection parameters are used to update a data structure associated with the same application used by the another client device in the communication session to optimize communication between the another client device and the VPN server while using the same type of application.

8. The VPN server of claim 7, wherein when a client device request to connect is received by the VPN server, the VPN server is configured to transmit the temporary data file to the requesting client device.

9. The VPN server of claim 8, wherein the processor is further configured to
apply one or more of the modified connection parameters to the requesting client device that sent the request; and
forward a new request to a different VPN server than the VPN server that received the request based on the applied one or more modified connection parameters.

10. The VPN server of claim 9, wherein the processor is further configured to
provide streaming content from the one or more servers via the different VPN server to the requesting client device by applying the one or more modified connection parameters.

11. The VPN server of claim 7, wherein the VPN server transmits the temporary data file to a another VPN server among a plurality of other VPN servers, and wherein when the another VPN server is monitored for the period of time and performance of a connection associated with the another VPN server has increased, transmitting the temporary data file to all remaining VPN servers of the plurality of other VPN servers.

12. The VPN server of claim 7, wherein the processor is further configured to
when a decrease in performance is identified by the client device, store a current connection status and the modified one or more connection parameters in the temporary data file;
forward the temporary data file to one or more other VPN servers and plurality of other client devices; and
attempt to connect to a different VPN server while using the application on the client device.

13. A non-transitory computer readable storage medium configured to store instructions that when executed cause a processor to perform:
enabling a connection between a client device and one or more servers via one a virtual private network (VPN) server, wherein the connection is established to have a specific data rate based on a type of application used by the client device;
monitoring, via the VPN server, connection performance of the connection over a period of time for the application used by the client device;
modifying one or more connection parameters of the connection including one or more of a data rate, data compression, a packet type and a protocol used on the connection;
identifying, via the VPN server, whether an increase or decrease in a performance of the connection has occurred based on the one or more modified connection parameters;
when an increase in performance is identified, storing, via the VPN server, a current connection status and the modified one or more modified connection parameters in a temporary data file, wherein the increase in performance is identified based on a determination the connection has maintained a data rate above a minimum data rate threshold and has not exceeded a packet loss threshold for a period of time while using the application;
determining, via the VPN server, another client device communicating with the VPN server is using a same type of application as the client device;

forwarding, via the VPN server, the temporary data file to the another client device; and receiving, via the VPN server, data from the another client device in a communication session between the VPN server and the another client device, wherein the one or more modified connection parameters are used to update a data structure associated with the same application used by the another client device in the communication session to optimize communication for between the another client device and the VPN server while using the same type of application.

14. The non-transitory computer readable storage medium of claim 13, wherein the processor is further configured to perform:

when a client device request to connect is received by the VPN server, forwarding the temporary data file to the requesting client device.

15. The non-transitory computer readable storage medium of claim 14, wherein the processor is further configured to perform:

applying one or more of the modified connection parameters to the requesting client device that sent the request; and forwarding a new request to a different VPN server than the VPN server that received the request based on the applied one or more modified connection parameters.

16. The non-transitory computer readable storage medium of claim 15, wherein the processor is further configured to perform:

providing streaming content from the one or more servers via the different VPN server to the requesting client device by applying the one or more modified connection parameters.

17. The non-transitory computer readable storage medium of claim 13, wherein the processor is further configured to perform transmitting the temporary data file to another VPN server among a plurality of other VPN servers, and wherein when the another VPN server is monitored for the period of time and performance of a connection associated with the another VPN server has increased, transmitting the temporary data file to all remaining VPN servers of the plurality of other VPN servers.

* * * * *